(12) United States Patent
Vangala et al.

(10) Patent No.: US 10,575,315 B2
(45) Date of Patent: Feb. 25, 2020

(54) SYSTEM AND METHOD FOR PROVIDING PRIORITY DATA OF BAND COMBINATIONS FOR CARRIER AGGREGATION

(71) Applicant: APPLE INC., Cupertino, CA (US)

(72) Inventors: Sarma V. Vangala, Campbell, CA (US); Swaminathan Balakrishnan, San Jose, CA (US); Tarik Tabet, San Jose, CA (US); Samy Khay-Ibbat, San Francisco, CA (US); Rafael L. Rivera-Barreto, Santa Clara, CA (US); Dawei Zhang, Saratoga, CA (US); Sree Ram Kodali, San Jose, CA (US)

(73) Assignee: Apple Inc., Cupertino, CA (US)

( * ) Notice: Subject to any disclaimer, the term of this patent is extended or adjusted under 35 U.S.C. 154(b) by 669 days.

(21) Appl. No.: 14/503,204

(22) Filed: Sep. 30, 2014

(65) Prior Publication Data

US 2015/0173094 A1    Jun. 18, 2015

Related U.S. Application Data

(60) Provisional application No. 61/916,652, filed on Dec. 16, 2013.

(51) Int. Cl.
*H04W 72/10* (2009.01)
*H04L 5/00* (2006.01)

(52) U.S. Cl.
CPC .............. *H04W 72/10* (2013.01); *H04L 5/001* (2013.01)

(58) Field of Classification Search
None
See application file for complete search history.

(56) References Cited

U.S. PATENT DOCUMENTS

| | | | | |
|---|---|---|---|---|
| 2011/0117973 A1* | 5/2011 | Asrani | ................ | H04W 52/245 455/571 |
| 2012/0094706 A1* | 4/2012 | Fukumoto | ........... | H04W 72/048 455/512 |
| 2013/0176953 A1* | 7/2013 | Stern-Berkowitz | ......................... | H04W 52/146 370/329 |
| 2013/0242922 A1* | 9/2013 | Suzuki | .................. | H04L 1/1607 370/329 |
| 2016/0205681 A1* | 7/2016 | Kim | ..................... | H04B 7/2656 370/329 |

\* cited by examiner

*Primary Examiner* — Ayaz R Sheikh
*Assistant Examiner* — Mariela Vidal Carpio
(74) *Attorney, Agent, or Firm* — Fay Kaplun & Marcin, LLP

(57) ABSTRACT

A system, devices and methods for providing input from a user equipment (UE) for the selection of a carrier channel combination for use in carrier aggregation. The exemplary system includes a UE configured to perform carrier aggregation, the UE storing a radio frequency (RF) calibration table including a plurality of transmission related requirements specific to the UE, the UE configured to generate priority data for each carrier channel combination supported for use in carrier aggregation based upon the RF calibration table and a network component receiving the priority data and an indication from the UE, the network component configured to select a carrier channel combination for use in carrier aggregation based upon the priority data, the network component transmitting carrier aggregation configuration data including the selected carrier channel combination to the UE.

19 Claims, 3 Drawing Sheets

SYSTEM AND METHOD FOR PROVIDING PRIORITY DATA OF BAND COMBINATIONS FOR CARRIER AGGREGATION

PRIORITY CLAIM/INCORPORATION BY REFERENCE

This application claims priority to U.S. Provisional Application 61/916,652 entitled "System and Method for Providing Priority Data of Band Combinations for Carrier Aggregation," filed on Dec. 16, 2013, the entirety of which is incorporated herein by reference.

BACKGROUND

Long-term evolution ("LTE") is a wireless communication standard used for high-speed data exchange for mobile devices and data terminals. LTE-Advanced is a major enhancement to the LTE standard. Within the LTE-Advanced standard, carrier aggregation is used to increase the bandwidth, and thereby increase the bitrates. Carrier aggregation has been introduced in the 3rd Generation Partnership Project ("3GPP") Release 10 (LTE-Advanced standard) to provide wider than 20 MHz transmission bandwidth to a single device (e.g., user equipment or "UE") while maintaining the backward compatibility with legacy UEs. Specifically, carrier aggregation may be defined as the aggregation of two or more component carriers in order to support wider transmission bandwidths. Carrier aggregation configuration may be defined as a combination of carrier aggregation operating bands, each supporting a carrier aggregation bandwidth class by a UE. The bandwidth class may be defined by the aggregated transmission bandwidth configuration and maximum number of component carriers supported by a UE.

Under the current standards, each aggregated carrier is referred to as a component carrier, and each component carrier can have a bandwidth of 1.4, 3, 5, 10, 15 or 20 MHz and a maximum of five component carriers can be aggregated. As illustrated in FIG. 1, two exemplary component carriers may each have a bandwidth of 10 MHz to combine for a total bandwidth of 20 MHz. With carrier aggregation features enabled, the LTE-Advanced standard device supporting 20 MHz carrier aggregation may achieve downlink ("DL") throughput of 100 Mbps.

SUMMARY

One of the exemplary embodiments describes a user equipment (UE) configured to perform a carrier aggregation functionality that performs a method. The method includes storing, a radio frequency (RF) calibration table including a plurality of transmission related requirements specific to the UE, generating priority data for each carrier channel combination supported for use in the carrier aggregation functionality by the UE based upon the RF calibration table, transmitting the priority data and an indication that the UE is configured to perform the carrier aggregation functionality to a network component and receiving from the network component, carrier aggregation configuration data indicating a selected carrier channel combination for use in the carrier aggregation functionality based upon the priority data.

A further exemplary embodiment describes a network component of a network configured to perform a carrier aggregation functionality that performs a method. The method includes receiving information from a user equipment (UE) configured to perform the carrier aggregation functionality, the information including an indication that the UE is configured to perform the carrier aggregation functionality and priority data, the priority data indicating a preference for each carrier channel combination supported for use in the carrier aggregation functionality by the UE, determining a selected carrier channel combination for use in the carrier aggregation functionality based upon the priority data and transmitting carrier aggregation configuration data indicating the selected carrier channel combination to the UE.

In another exemplary embodiment, a system having a user equipment (UE) and a network component is described. The user equipment (UE) is configured to perform a carrier aggregation functionality, the UE storing a radio frequency (RF) calibration table including a plurality of transmission related requirements specific to the UE, the UE configured to generate priority data for each carrier channel combination supported for use in the carrier aggregation functionality based upon the RF calibration table. The network component receives the priority data and an indication from the UE that the UE is configured to perform the carrier aggregation functionality, the network component configured to select a carrier channel combination for use in the carrier aggregation functionality of the UE based upon the priority data, the network component transmitting carrier aggregation configuration data including the selected carrier channel combination to the UE.

DETAILED DESCRIPTION

Figure 1:
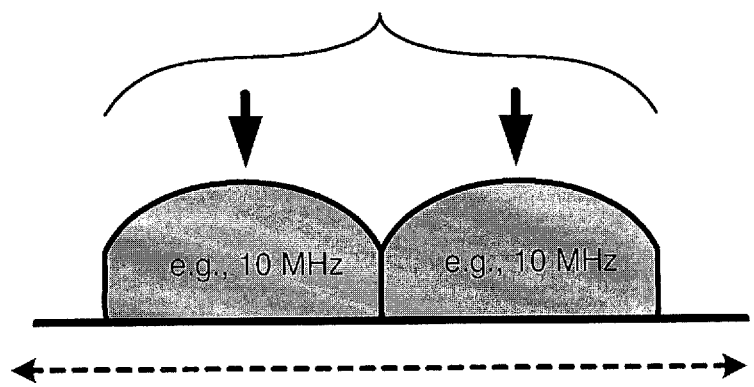
FIG. 1 (discussed above) shows an example of carrier aggregation including two component carriers each having a bandwidth of 10 MHz for a total bandwidth of 20 MHz.

The exemplary embodiments may be further understood with reference to the following description and the appended drawings, wherein like elements are referred to with the same reference numerals. The exemplary embodiments show systems and methods for providing priority data of band combinations based on the UE for carrier aggregation. Specifically, a carrier aggregation capable UE may generate the priority data based upon testing data stored in the UE such as signal requirements to determine which band combinations are preferable for use in carrier aggregation. The priority data, the band combinations, the carrier aggregation, the UE, the signal requirements, and a related method will be described in further detail below.

When carrier aggregation is used, there may be a number of serving cells for each of the component carriers. The coverage of the serving cells may differ due to both component carrier frequencies and power planning, which is useful for heterogeneous network planning. A radio resource control ("RRC") connection is handled by one cell, namely the primary serving cell ("PCell"), served by the primary component carrier ("PCC") for uplink ("UL") and downlink ("DL"). Specifically, with the LTE-Advanced network, the PCell may be an Evolved Node B (eNB) which is a hardware network component connected to a mobile network for communicating directly with UEs in a substantially similar manner as base transceiver stations in a GSM network.

The other component carriers may be referred to as secondary component carriers ("SCC") for UL and DL, serving the secondary serving cells ("SCells"). The SCCs are added and removed as required, while the PCC is changed at handover. The SCells may also be eNBs. Those skilled in the art will understand that the PCell and SCells are logical constructs allowing for the addition of SCells as needed. The PCell is the main cell that is used for all Radio Resource Control (RRC) signaling and control procedures, while the SCell is considered an augmentation to the PCell. As will be described in greater detail below, the exemplary systems and methods for providing priority data of band combinations for carrier aggregation may be used by the PCell to enable a UE to utilize carrier aggregation on a preferred band combination.

According to an exemplary embodiment described herein, a carrier may deploy a carrier aggregation configuration using two or more component carriers. Furthermore, the exemplary component carrier configuration may be selected based upon a priority or preference respective of the UE. As shown in FIG. 1, the PCell may provide a first component carrier of 10 MHz representing the PCC while the SCell may provide a second component carrier of 10 MHz representing the SCC. Also shown in FIG. 1 is one type of carrier aggregation. Specifically, FIG. 1 shows the two component carriers in an intra-band carrier aggregation with continuous component carriers. However, those skilled in the art will understand that other types of carrier aggregation may also be used such as intra-band carrier aggregation with non-continuous component carriers, inter-band carrier aggregation, or any combination of these three types.

It should also be noted that with carrier aggregation, the UE may be configured with cross carrier scheduling. When LTE-Advanced carrier aggregation is used, it is necessary to be able to schedule the data across the carriers and to inform the UE of the format of various data being transmitted in each component carrier such as physical downlink shared channel (PDSCH) data. All of this information may be transmitted through the PCC if cross carrier scheduling is used. Enabling of the cross carrier scheduling is achieved individually via the RRC signaling on a per component carrier basis or a per terminal basis. When no cross carrier scheduling is arranged, the downlink scheduling assignments are achieved on a per carrier basis. That is, they are valid for the component carrier on which they were transmitted. For the uplink, an association is created between one downlink component carrier and an uplink component carrier. In this way, when uplink grants are sent, the UE is aware of which uplink component carrier the grant applies.

The allowed component carrier configurations of the network are known by both the UE and the eNB. Upon association with the eNB, the UE may transmit data relating to specifications of the UE or the eNB may already have these specifications stored so that only an identity of the UE or type of UE is required. The UE may also indicate to the eNB that the carrier aggregation capability is activated for the eNB to supply the component carrier configuration. However, in the current implementation of carrier aggregation, the eNB simply provides the component carrier configuration (e.g., component carrier band information) to be used by the UE based upon the allowed component carrier configurations. Specifically, through the RRC reconfiguration message, the UE receives the eNB selected component carrier configuration. The UE is then required to use the eNB selected PCC and SCC(s).

The above manner of providing the component carrier configuration from the eNB to the UE may not be an optimal solution as the UE may have some band combinations of component carriers that provide a sub-optimal performance. For example, certain band combination degradations may occur due to a variety of reasons such as Total Radiated Power (TRP)/Total Isotropic Sensitivity (TIS) requirements, Specific Absorption Rate (SAR) requirements, intermodulation products causing degradation, proximity sensor back off requirements, etc.

In another example, the UE may have various hardware and/or software limitations which make some combinations of carriers unfavorable for use. As will be described in greater detail below, this information is stored by the UE and is generally based on testing information that is specific to the UE. However, in current implementations, the eNB never receives this information and merely selects from the pool of available component carrier configurations without consideration of how optimal the selected component carrier configuration is for the UE.

The hardware and/or software of the UE may also define the various requirements indicated above. In a first example, the TRP relates to a measurement of antenna gain with or without the power absorption effects (i.e., loss) that may be caused by objects in the proximity of the antenna of the UE. The TRP may be a known value as it is measured in a lab as radiated power compared to an Isotropic Antenna. The TRP may also be measured while in close proximity of power absorbing losses such as the body and hand of a user of the UE. The TRP may further be used to determine Body Loss (BoL). The BoL is measured as a ratio of the TRP measured in the presence of losses and the TRP measured while in open space. Therefore, the TRP may be a predetermined value that is known prior to deployment of the UE. Accordingly, the TRP value may be stored on the UE.

The TIS relates to a measurement of average sensitivity of a receiver-antenna system of the UE when averaged over the entire 3-dimensional sphere surrounding the UE. The result may be strongly related to the radiation pattern of the antenna of the UE. The TIS may also be a known value as it is measured in a lab. Specifically, the TIS is measured by placing the UE in an anechoic chamber and a chamber antenna transmits signals to the UE. The power of the chamber antenna may be lowered until a Bit Error Rate (BER) reaches a predetermined threshold value (e.g., 2%). Through testing under known angle and polarization combinations, an effective isotropic sensitivity (EIS) may be derived for the respective angle/polarization combination. Therefore, the TIS may also be a predetermined value that is known prior to deployment of the UE and stored thereon. Since the TRP and the TIS relate to the hardware of the UE itself, these values may be individual to a respective UE. Furthermore, those skilled in the art will understand that every piece of hardware may include slight differences although an identical model. Therefore, the TRP and the TIS may be specific to the UE.

In a second example, the SAR relates to a measurement of the rate of RF energy absorption by the body of the user from the source being measured (i.e., the UE). The SAR provides a straightforward means for measuring the RF exposure characteristics of UEs to ensure that they are within the safety guidelines set by an administrative agency (e.g., the Federal Communications Commission (FCC)). The SAR may also be a known value as it is measured in a lab. Specifically, the testing for the SAR value uses standardized models of the human head and body that are filled with liquids that simulate the RF absorption characteristics of different human tissues. In order to determine compliance, each UE is tested while operating at its highest power level in all the frequency bands in which it operates as well as in every possible position in which the UE may be used. Once compliance is demonstrated, the UE may be allowed to be deployed. Therefore, the SAR may also be a predetermined value that is known prior to deployment and may be stored on the UE. In addition, the compliance is demonstrated by being within acceptable parameters defined by the administrative agency. However, these acceptable parameters may be different for each administrative agency. Furthermore, much like the TRP and TIS, since the SAR relates to the hardware of the UE itself, these values may be individual to the respective UE.

In a third example, the intermodulation product that causes degradation relates to a measurement of amplitude modulation of signals including two or more different frequencies in a system with nonlinearities. The intermodulation product between each frequency component may form additional signals at frequencies that are not at harmonic frequencies (e.g., integer multiples) of either and at the sum and difference frequencies of the original frequencies as well as at multiples of those sum and difference frequencies. Therefore, with carrier aggregation, the intermodulation product may cause signals transmitted in the component carriers to affect one another, particularly with the intra-band carrier aggregation having continuous component carriers. Although the intermodulation product may initially relate to the frequencies of signals, the intermodulation product is also associated with the antenna of the UE and the configuration/orientation thereof. The UE may be configured to measure the intermodulation product of carrier aggregation combinations and store these measurements to determine a reliability of the respective combination. Therefore, the intermodulation product may also be a predetermined value that is stored on the respective UE. Furthermore, since the intermodulation product relates to the hardware of the UE itself, these values may be individual to the respective UE.

In a fourth example, the proximity sensor back off may be measurements related to objects near and around the UE that causes signal transmission/reception to be affected. That is, the proximity sensor back off may be values related to distances to objects from the UE. These distances (measured by sensors of the UE) may indicate when signal transmission/reception may be affected from the proximity to an object. Those skilled in the art will understand that the effect of objects for signal transmission/reception is both contributed to the frequency of the signal as well as the antenna configuration/orientation on the UE. These values may be tested in a lab to be predetermined. Therefore, the proximity sensor back off may also be a predetermined value that is known prior to deployment of the UE and stored on the UE. Furthermore, since the proximity sensor back off relates to the hardware of the UE itself, these values may be individual to the respective UE.

It should be noted that the TRP/TIS, SAR, intermodulation products, and proximity sensor back off values may be predetermined prior to deployment. These values may also be adjusted after deployment. For example, the UE may be configured to continually measure and store these types of values while the UE is performing signal transmission functionalities. As these values are associated with hardware components of the UE, the values that were determined in a lab setting may be different from an actual use in a different environment. Accordingly, the UE may also determine and/or update these values during the life of the UE. Furthermore, as hardware (including the antenna and the housing of the UE) often experiences physical changes from being used, these values may be changed due to these physical changes. Therefore, the UE may be configured to determine and/or update these values accordingly.

It should be noted that the above described parameters are only exemplary and other parameters may also be used to measure the performance of the individual UE. These other parameters may be used in the same manner as described herein for the exemplary parameters.

Figure 2:
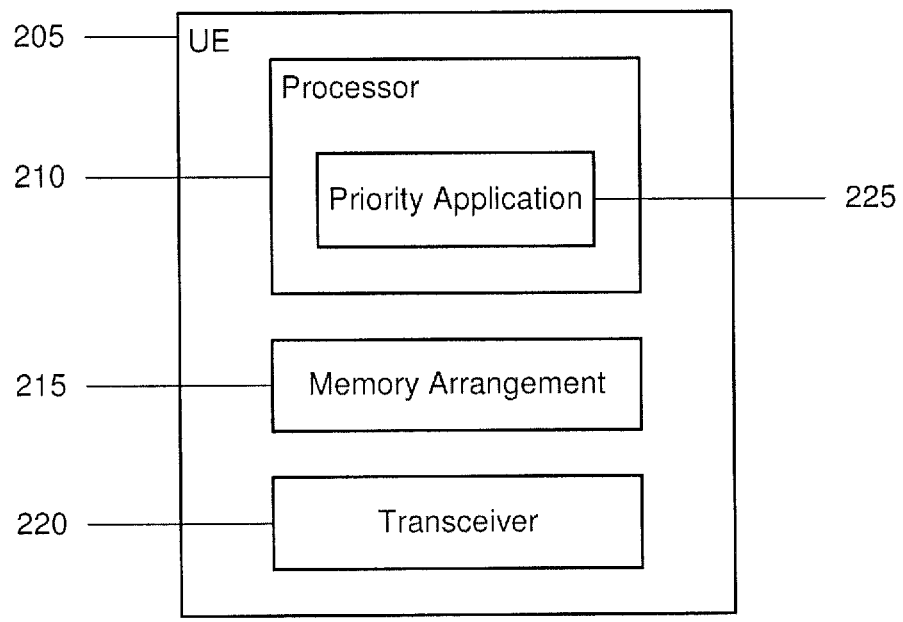
FIG. 2 shows an exemplary system in which priority data of combined bands is used for carrier aggregation.

FIG. 2 shows an exemplary system 200 in which priority data of combined bands is used for carrier aggregation. The system 200 includes a UE 205 and an eNB 230. As discussed above, the UE 205 may associate with the eNB 230 to join the network corresponding to the eNB 230 (e.g., LTE network). The UE 205 may also include the carrier aggregation functionality that may be enabled and indicated to the eNB 230. As the UE 205 is associated with the eNB 230, the eNB 230 may provide the carrier aggregation configuration for component carriers to be used by the UE 205 in which the eNB 230 may be the PCell and further eNBs (not shown) may be the SCells.

The UE 205 may be any electronic component configured to join a network via the eNB 230. For example, the UE 205 may be a portable device such as a cellular phone, a smartphone, a tablet, a phablet, a laptop, etc. In another example, the UE 205 may be a stationary device such as a desktop terminal. The UE 205 may also operate on a variety of different frequencies or channels (i.e., range of continuous frequencies). Accordingly, the UE 205 may include components that enable different wireless technologies. As shown in FIG. 2, the UE 205 may include a processor 210, a memory arrangement 215, and a transceiver 220. However, the UE 205 may also include further components such as a display device, an input/output (I/O) device, a portable power supply, an audio I/O device, etc.

The processor 210 may be configured to execute a plurality of applications of the UE 205. For example, the applications may include a web browser when connected to a communication network via the transceiver 220. Accordingly, data may be exchanged with the network. More specifically, the data may be exchanged using carrier aggregation to increase a rate in which the data is exchanged. In another example, the applications may include a priority application 225 that provides priority data to the eNB 230. The priority data may indicate whether a particular carrier aggregation band combination has a preference over other band combinations or whether select band combinations are preferred over other band combinations. As will be described in further detail below, the priority data may be generated by the processor 210 using a RF calibration table that is stored on the memory arrangement 215. It should be noted that the priority application 225 being an application (e.g., a program) executed by the processor 210 is only exemplary. The priority application 225 may also be represented as a separate incorporated component of the UE 205 or may be a modular component coupled to the UE 205. For example, the functionality described herein for the priority application may be performed by a separate integrated circuit with or without firmware.

The memory arrangement 215 may be a hardware component configured to store data related to operations performed by the UE 205. Specifically, the memory arrangement 215 may store the RF calibration table. The RF calibration table may include the various limitations of the UE 205 including hardware and software limitations. In a first example, the RF calibration table may include the allowed band combinations supported by the UE 205. Those skilled in the art will understand that permissible band combinations may be a function of a variety of factors such as network provider, geographic location, country, etc. In a second example, the RF calibration table may include the various requirements specific to the UE 205 such as the TRP/TIS requirements, the SAR requirements, the intermodulation products causing degradation, and the proximity sensor back off requirements. Using these requirements that are known to the UE 205, the priority application 225 may generate the priority data for the different band combinations. For example, the different band combinations may be compared to a predetermined norm value indicating a threshold operating value for transmissions. The different band combinations may have a respective operating value for transmissions based upon the different known requirements. When a band combination has an operating value that is greater than the threshold operating value, this band combination may be considered to be a preferred band combination. When a band combination has an operating value that is less than the threshold operating value, this band combination may be considered to be a sub-optimal band combination that should be avoided from selection by the eNB 230.

In a specific example, the RF calibration table provides the TIS/TRP requirements for every band combination over all technologies supported by the UE 205. For wider bands, a combined Maximum Tolerable Path Loss (MTPL) may be determined. To be considered a preferred band combination, the MTPL may be less than the SAR requirement (e.g., approximately 23 decibel milliwatt (dBM)) to avoid spillover onto adjacent bands of the band combination. Using this criteria, the priority application 225 may utilize the RF calibration table to generate an internal ranking of the various band combinations that the UE 205 is allowed to operate. That is, the priority application 225 may generate the priority data for the band combinations.

The UE 205 may provide the priority data to the eNB 230 prior to the eNB 230 assigning the carrier aggregation configuration information for the UE 205. For example, upon associating with the eNB 230, the UE 205 may transmit an RRC UECapalibilityInformation packet. This packet may indicate that the UE 205 is capable of the carrier aggregation functionality. Furthermore, this packet may also include the priority data. In a first example, the priority data may be included in a payload of the packet that includes a priority list. The priority list may rank each allowed band combination respective of the UE 205. Therefore, the priority list may indicate a first (most) preferred band combination, a second preferred band combination, and an N (least) preferred band combination to be used in carrier aggregation. In a second example, the priority data may be included using a CCPreferenceIndicator bit in the packet for each assignment of band combinations. Specifically, each band combination may have a corresponding bit that is set (e.g., a value of "0" or a value of "1") that indicates whether the particular band combination is preferred or not. For example, when the bit is set to "0", the eNB 230 may be aware that the corresponding band combination is not preferred by the UE 205 whereas when the bit is set to "1", the eNB 230 may be aware that the corresponding band combination is preferred by the UE 205.

It should be noted that the above examples of providing the priority data to the eNB 230 may be at the time when the UE 205 associates with the eNB 230. That is, these examples may relate to a time when the UE 205 indicates to the eNB that it is capable of the carrier aggregation functionality.

In a third example, the UE 205 may also provide the priority data after a connection is already established with the network via the eNB 230. Specifically, in an alternative embodiment, a Media Access Control (MAC) element may be used to provide the priority data that indicates the preferred band combinations.

Once the UE 205 indicates that it is configured with the carrier aggregation functionality (e.g., via the RRC UECapabilityInformation packet) and provides the priority data for band combinations to the eNB 230, the eNB 230 may determine the carrier aggregation configuration to be assigned and provided to the UE 205. Ultimately, the selection of the band combination used in the carrier aggregation configuration may be performed by the eNB 230. However, as discussed above, the UE 205 may indicate preferred band combinations, which the eNB 230 is configured to consider prior to the selection.

Since the eNB 230 selects the band combination for carrier aggregation for the UE 205, the eNB 230 may select the band combination using the priority data as a basis. The eNB 230 (as the PCell) may initially determine the PCC to be assigned to the UE 205. Through communication with further eNBs, the eNB 230 may also determine the SCells to be used in the band combination selection. Thus, depending on availability of the component carrier bands, the eNB 230 may select the band combination to be used in the carrier aggregation using already considered criteria but now may also consider the preferences of the UE 205 based upon the priority data that is provided. Once the band combination is selected for the UE 205, the eNB 230 may transmit the carrier aggregation configuration to the UE 205. Subsequently, the UE 205 may exchange data with the network using carrier aggregation at the selected band combination indicated in the carrier aggregation configuration.

Figure 3:
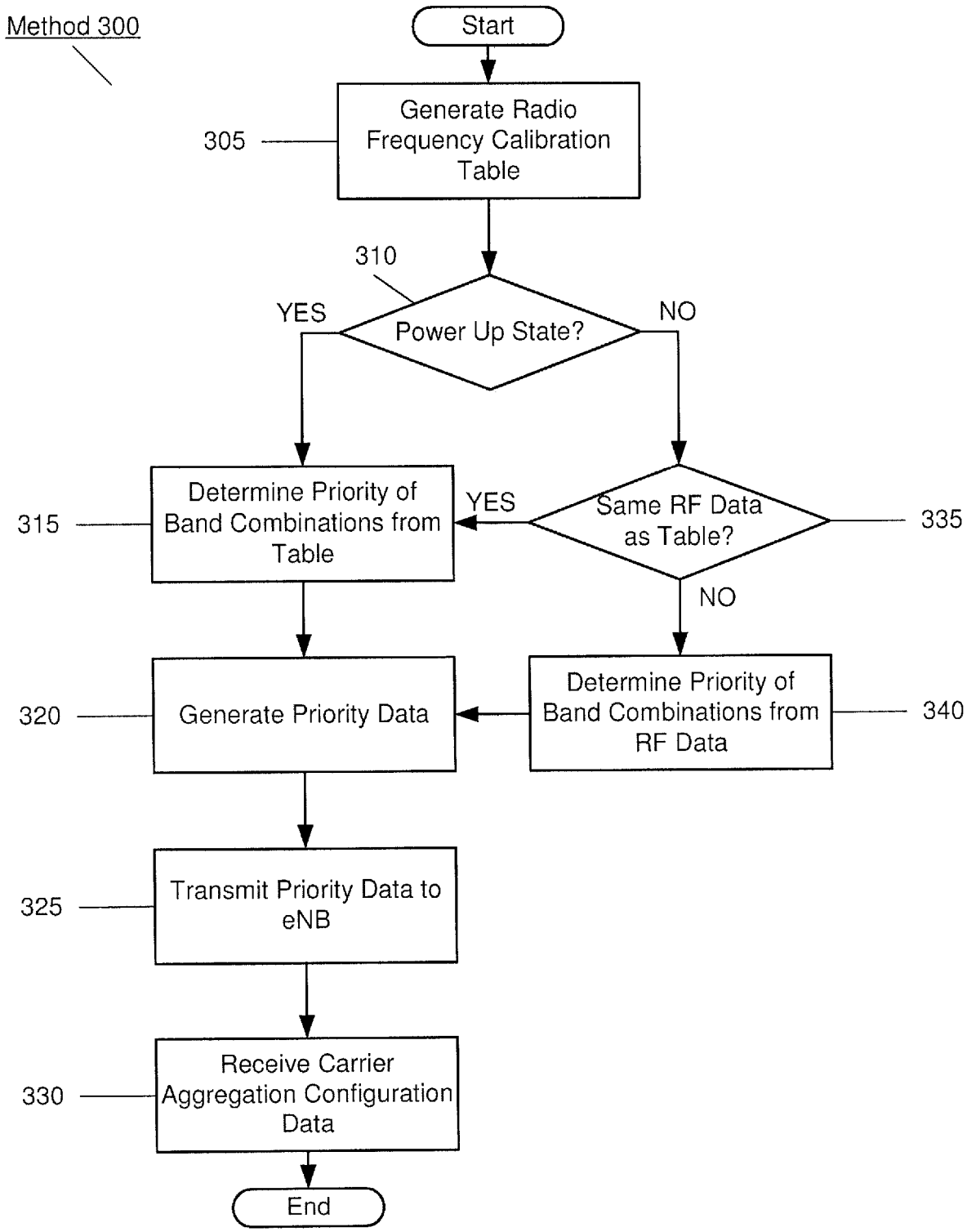
FIG. 3 shows an exemplary method for providing priority data of combined bands used in carrier aggregation to a network component.

FIG. 3 shows an exemplary method 300 for providing priority data of combined bands used in carrier aggregation to a network component, specifically from the UE 205 to the eNB 230. In step 305, the priority application 225 generates the RF calibration table based upon the various requirements specific to the UE 205 and stores this table in the memory arrangement 215. As discussed above, these requirements may be measured at a previous time such that the RF calibration table may be generated. However, as also described above, the UE may continuously measure the requirements, such that the table may be updated or regenerated at various times to account for changes in the measured requirements.

In step 310, the priority application 225 determines whether the UE 205 is in a power up state (i.e., is associating with the eNB 230). If the UE 205 is in the power up state, the method 300 continues to step 315. In step 315, the priority application 225 determines the priority for each band combination based upon the information included in the RF calibration table. In step 320, the priority application 225 generates the priority data based upon the priority information respective of each band combination. For example, the operating values may be used.

In step 325, the UE 205 transmits the priority data to the eNB 230. As discussed above, since the UE 205 is in the power up state, the priority data may be included in the RRC UECapabilityInformation packet as a priority list or using a CCPreferenceIndicator bit in this packet. Furthermore, the UECapabilityInformation packet may indicate to the eNB 230 that the UE 205 is configured with the carrier aggregation functionality. Upon receiving the priority data, the eNB 230 selects a band combination to be used for carrier aggregation in the UE 205. Thus, in step 330, the UE 205 receives the carrier aggregation configuration data from the eNB 230.

Returning to step 310, if the UE 205 is not in the power up state and has already established a connection to the network, the method 300 continues to step 335. In step 335, the priority application 225 determines whether the RF data of the UE 205 is the same as the RF calibration table. For example, after using the UE 205, the hardware components (e.g., the antenna) may experience a physical change or during use of the UE 205 with power flowing through internal communication paths and/or a different measured TRP/TIS due to a detuning effect from a head or hand of the user, the RF data may be different from the RF calibration table. If the same, the method 300 continues to step 315. However, if different, the method 300 continues to step 340. In step 340, the priority application 225 determines the priority of band combinations from the RF data. Specifically, the MAC element may be used for the subsequent generation (step 320) and transmission (step 325) of the priority data. The method 300 then proceeds to step 320 from step 340.

The exemplary embodiments are described with reference to the LTE-Advanced carrier aggregation scheme that has certain characteristics. For example, in frequency-division duplexing ("FDD"), the characteristics include that the number of aggregated carriers may be different in DL and uplink ("UL"), typically, the number of UL component carriers is equal to or lower than the number of DL component carriers. In addition, the individual component carriers may also be of different bandwidths. Alternatively, when time division duplexing ("TDD") is used, the number of component carriers and the bandwidth of each component carrier are the same for DL and UL. However, those skilled in the art will understand that the exemplary embodiments may be applied to any carrier aggregation scheme including those having different characteristics from the LTE-Advanced scheme.

The exemplary embodiments provide a system and method for providing priority data from a carrier aggregation capable UE to an eNB in which the priority data indicates a preference for select band combinations to be used in carrier aggregation. Based upon various requirements specific to the UE, a RF calibration table may be stored on the UE such that a priority application of the UE may generate the priority data for the allowed band combinations that is supported by the UE. When the UE indicates to the eNB that it is carrier aggregation capable, the priority data may also be provided. Thus, the eNB may select an appropriate band combination using the priority data as a consideration. Accordingly, the band combination used in carrier aggregation by the UE may provide a more optimal experience than an arbitrary selection of a band combination by the eNB based upon allowed combinations only.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
at a user equipment (UE) configured to perform a carrier aggregation functionality:
generating a radio frequency (RF) calibration table including a plurality of carrier channel combinations of the carrier aggregation functionality supported by the UE and at least one transmission related requirement value for each of the plurality of carrier channel combinations,
wherein the at least one transmission related requirement value is at least one of a Total Radiated Power (TRP) value, a Total Isotropic Sensitivity (TIS) value, a Specific Absorption Rate (SAR) value, intermodulation products causing degradation values, or a proximity sensor back off value;
storing the RF calibration table;
generating priority data indicating prioritized and deprioritized carrier channel combinations of the plurality of carrier channel combinations based upon the at least one transmission related requirement value for each of the plurality of carrier channel combinations;
transmitting the priority data and an indication that the UE is configured to perform the carrier aggregation functionality to a network component; and
receiving from the network component, carrier aggregation configuration data indicating a selected carrier channel combination of the plurality of carrier channel combinations for use in the carrier aggregation functionality based upon the priority data.

2. The method of claim 1, wherein the transmission related requirements are one of stored prior to deployment of the UE or stored after deployment of the UE.

3. The method of claim 1, wherein the priority data lists each carrier channel combination supported for use in the carrier aggregation functionality in a ranked order.

4. The method of claim 1, wherein the priority data provides a preference indication as to whether each carrier channel combination supported for use in the carrier aggregation functionality is a preferred carrier channel combination.

5. The method of claim 1, wherein the transmitting of the priority data and the indication is performed when the UE is associating with the network component.

6. The method of claim 1, wherein the transmitting of the priority data is performed after the UE is associated with the network component and wherein the priority data is transmitted via a Medium Access Control (MAC) communication between the UE and the network component.

7. The method of claim 1, wherein the UE is a Long Term Evolution (LTE) capable UE and the network component is an evolved Node B (eNB).

8. The method of claim 1, wherein the generating the priority data includes:
determining an operating value for UE transmissions for each of the plurality of carrier channel combinations based on the at least one respective transmission related requirement value; and
comparing the operating value for each of the plurality of carrier channel combinations to a threshold operating value.

9. The method of claim 1, wherein values of the transmission related requirements are updated during the life of the UE in response to physical changes of the UE.

10. A method, comprising:
at a network component of a network configured to perform a carrier aggregation functionality:
receiving information from a user equipment (UE) configured to perform the carrier aggregation functionality, the information including an indication that the UE is configured to perform the carrier aggregation functionality and priority data, the priority data indicating prioritized and deprioritized carrier channel combinations of a plurality of carrier channel combinations supported for use in the carrier aggregation functionality by the UE, wherein the priority data is based upon at least one transmission related requirement value for each of the plurality of carrier channel combinations which are included in a radio frequency (RF) calibration table, wherein the at least one transmission related requirement value is at least one of a Total Radiated Power (TRP), a Total Isotropic Sensitivity (TIS) value, a Specific Absorption Rate (SAR) value, inter modulation products causing degradation values, or a proximity sensor back off value;
determining a selected carrier channel combination of the plurality of carrier channel combinations for use in the carrier aggregation functionality based upon the priority data; and
transmitting carrier aggregation configuration data indicating the selected carrier channel combination to the UE.

11. The method of claim 10, wherein the priority data lists each of the plurality of carrier channel combinations supported for use in the carrier aggregation functionality in a ranked order.

12. The method of claim 10, wherein the priority data provides a preference indication as to whether each of the plurality of carrier channel combinations supported for use in the carrier aggregation functionality is a preferred carrier channel combination.

13. The method of claim 10, wherein the receiving of the priority data and the indication occurs when the UE is associating with the network component.

14. The method of claim 10, wherein the receiving of the priority data occurs after the UE is associated with the network component and wherein the priority data is received via a Medium Access Control (MAC) communication between the UE and the network component.

15. The method of claim 10, wherein the network is a Long Term Evolution (LTE) network and the network component is an evolved Node B (eNB).

16. The method of claim 10, wherein determining the selected carrier channel combination for use in the carrier aggregation functionality is based upon the priority data and additional data stored by the network component.

17. A system, comprising:
a user equipment (UE) configured to perform a carrier aggregation functionality, the UE generating a radio frequency (RF) calibration table including a plurality of carrier channel combinations of the carrier aggregation functionality supported by the UE and at least one transmission related requirement for each of the plurality of carrier channel combinations,
wherein the at least one transmission related requirement value is at least one of a Total Radiated Power (TRP), a Total Isotropic Sensitivity (TIS) value, a Specific Absorption Rate (SAR) value, intermodulation products causing degradation values, or a proximity sensor back off value;
storing the RF calibration table, wherein the UE is configured to generate priority data indicating prioritized and deprioritized carrier channel combination of the plurality of carrier channel combinations based upon the at least one transmission related requirement value for each of the plurality of carrier channel combinations; and
a network component receiving the priority data and an indication from the UE that the UE is configured to perform the carrier aggregation functionality, the network component configured to select a carrier channel combination of the plurality of carrier channel combinations for use in the carrier aggregation functionality of the UE based upon the priority data, the network component transmitting carrier aggregation configuration data including the selected carrier channel combination to the UE.

18. The system of claim 17, wherein the priority data lists one of (i) each of the plurality of carrier channel combinations supported for use in the carrier aggregation functionality in a ranked order, or (ii) provides a preference indication as to whether each of the plurality of carrier channel combinations supported for use in the carrier aggregation functionality is a preferred carrier channel combination.

19. The system of claim 17, wherein the receiving of the priority data and the indication occurs when the UE is associating with the network component.

* * * * *

UNITED STATES PATENT AND TRADEMARK OFFICE
CERTIFICATE OF CORRECTION

PATENT NO. : 10,575,315 B2
APPLICATION NO. : 14/503204
DATED : February 25, 2020
INVENTOR(S) : Vangala et al.

Page 1 of 1

It is certified that error appears in the above-identified patent and that said Letters Patent is hereby corrected as shown below:

In the Claims

Claim 10, Column 11, Lines 22-23:
"Isotropic Sensitivity (TIS) value, a Specific Absorption Rate (SAR) value, inter modulation products" should read "Isotropic Sensitivity (TIS) value, a Specific Absorption Rate (SAR) value, intermodulation products"

Signed and Sealed this
Twelfth Day of May, 2020

Andrei Iancu
*Director of the United States Patent and Trademark Office*